United States Patent [19]

Hekimian et al.

[11] 4,149,044
[45] Apr. 10, 1979

[54] METHOD AND APPARATUS FOR GRAPHICALLY DISPLAYING AMPLITUDE AND PHASE JITTER

[76] Inventors: Norris C. Hekimian, 1517 Baylor Ave., Rockville, Md. 20850; Chong-Soo Kim, 951 Clopper Rd., Gaithersburg, Md. 20760

[21] Appl. No.: 868,429

[22] Filed: Jan. 10, 1978

[51] Int. Cl.² ............................................. H04B 3/46
[52] U.S. Cl. ........................... 179/175.3 R; 324/121 R
[58] Field of Search .......... 179/175.3 R; 324/57 DE, 324/73 R, 73 AT, 83 R, 83 A, 83 D, 83 Q, 121 R; 333/70 R, 70 A; 325/67, 133; 328/162

[56] References Cited

U.S. PATENT DOCUMENTS

| | | | |
|---|---|---|---|
| 3,711,773 | 1/1973 | Hekimian et al. | 324/83 R |
| 3,814,868 | 6/1974 | Bradley | 179/175.3 R |
| 3,906,173 | 9/1975 | Bradley | 179/175.3 R |
| 3,927,281 | 12/1975 | Bradley | 179/175.3 R |
| 3,985,980 | 10/1976 | Bradley | 179/175.3 R |
| 4,041,254 | 8/1977 | Bradley et al. | 179/175.3 R |

*Primary Examiner*—Thomas A. Robinson
*Attorney, Agent, or Firm*—Rose & Edell

[57] ABSTRACT

Amplitude and phase jitter can be individually or simultaneously viewed and immediately quantified on an oscilloscope by alternately applying both jitter signals to the vertical (or horizontal) deflection plates at a prescribed chopping frequency and applying the chopping signal to the horizontal (or vertical) deflection plates. The chopping signal frequency should be sufficiently greater than the bandwidth of the jitter signals to permit proper sampling. The resulting display is two spaced vertical (or horizontal) lines, the lengths of which represent instantaneous amplitude and phase jitter, respectively. Another embodiment alternately applies one of the jitter signals to the vertical plates while grounding the horizontal plates and applies the other jitter signal to the horizontal plates while grounding the vertical plates, the alternation being effected at a chopping frequency which is sufficiently high to permit proper sampling of the jitter signals. The resulting display is two perpendicular lines, the lengths of which represent the instantaneous amplitude of the amplitude and phase jitter.

8 Claims, 7 Drawing Figures

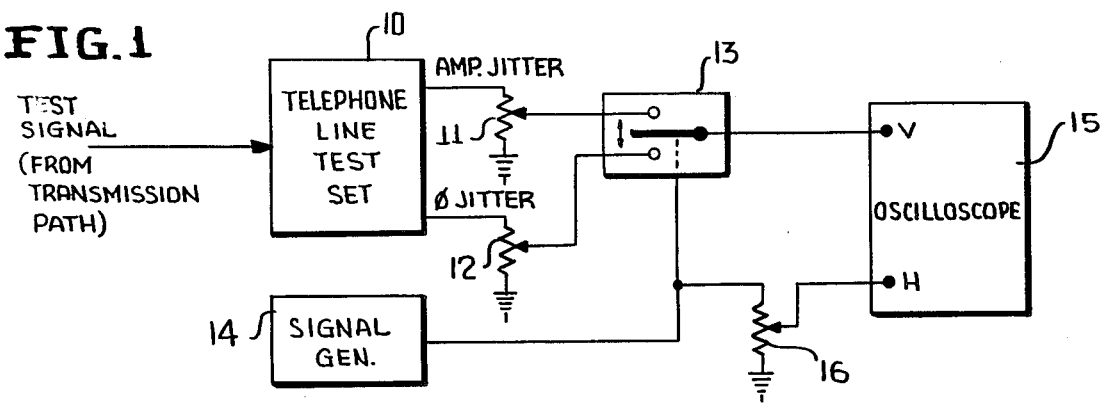
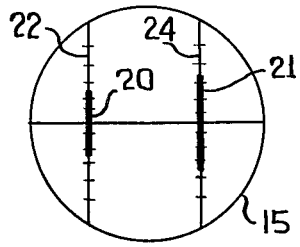 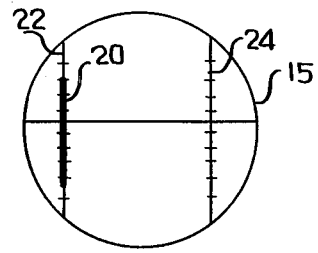 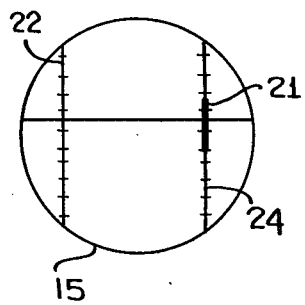
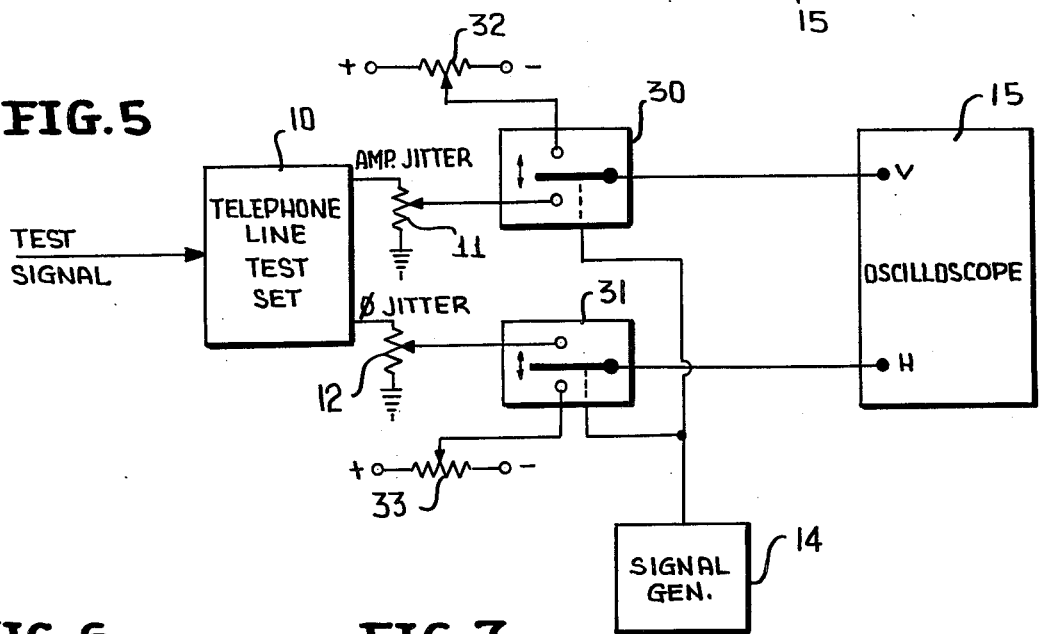
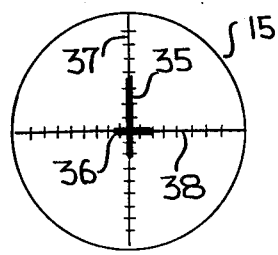 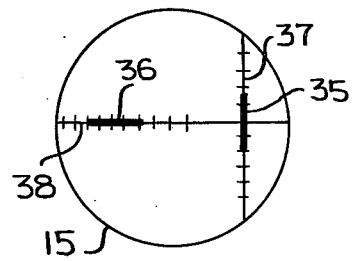

METHOD AND APPARATUS FOR GRAPHICALLY DISPLAYING AMPLITUDE AND PHASE JITTER

BACKGROUND OF THE INVENTION

The present invention relates to display of amplitude and phase jitter.

Present day sophistication of telephone line test instruments has brought about a need for measurement of amplitude and phase jitter which are introduced onto a signal while it traverses a transmission medium. An example of a phase jitter meter may be found in U.S. Pat. No. 3,711,773, to Hekimian et al, which patent is expressly incorporated herein by reference. As described in that patent a test signal, having a frequency residing in the pass band of the transmission path under test, is transmitted through that path to an instrument which separates the phase jitter introduced by the transmission path from the test signal. The separated phase jitter signal may be viewed on an oscilloscope (e.g. the "EXT. PHASE JITTER OUTPUT" signal in FIG. 4 of the Hekimian et al patent) or it may be rectified and monitored on a meter (e.g. meter M201 in FIG. 3 of the Hekimian et al patent). Amplitude jitter, which was not a standard measurement at the time the system of the Hekimian et al patent was developed, could also be viewed on an oscilloscope by utilizing the amplitude jitter signal provided at the output of filter 28 in FIG. 2 (corresponding to the output of amplifier 463 in FIG. 5) in the Hekimian et al patent.

An arrangement for simultaneously displaying approximate amplitude and phase jitter on an oscilloscope is described in U.S. Pat. No. 3,906,173, to Bradley. In that patent a co-phase signal is applied to the vertical deflection plates of an oscilloscope while the quadrature signal is applied to the horizontal deflection plates. The resulting display is a centered dot (in the absence of phase and amplitude disturbance) which expands to a vertical line in response to pure amplitude jitter, to a somewhat arcuate horizontal line in response to pure phase jitter, and to a line at some angle between vertical and horizontal in response to simultaneous amplitude and phase jitter. When both amplitude and phase jitter are simultaneously present, the viewer is required to approximate the X and Y axes projections of the angularly displaced trace in order to quantify the phase and amplitude jitter, respectively. This is not always feasible, particularly for short term disturbances (i.e. "hits") of either jitter parameter. Moreover, even when only phase jitter is present, the arcuate nature of the trace requires visual approximation of the X-axis projection for proper quantification.

It is therefore an object of the present invention to provide a display for amplitude and phase jitter which permits each of these parameters to be easily and immediately quantified.

It is another object of the present invention to provide a phase and/or amplitude jitter display which is easily interpreted.

It is still another object of the present invention to provide an improved method of displaying amplitude and phase jitter.

SUMMARY OF THE INVENTION

In accordance with the present invention the amplitude and phase jitter signals are alternately applied to the oscilloscope by means of a chopper circuit. In a first embodiment the two jitter signals are alternately applied to the vertical deflection plates of the scope while the chopping signal is applied to the horizontal plates. The result is a display having two spaced vertical lines, the length of one representing amplitude jitter, the length of the other representing phase jitter. There is no angular displacement of these signals and hence no need to make approximate projections onto the X and Y axes. Of course, the jitter signals may be alternately applied to the horizontal plates and the chopping signal to the vertical plates to provide two spaced horizontal lines. Graticule scale may be disposed colinear with each trace to render quantification immediate.

In a second embodiment the amplitude and phase jitter are alternately applied to the vertical and horizontal deflecting plates, respectively, while the inactive deflection plates are grounded. The resulting display is a vertical line representing amplitude jitter and a horizontal line representing phase jitter. The lines may be positioned so that they cross one another or they may be spaced from one another. Of course, the phase jitter may be displayed as a vertical line and the amplitude jitter as a horizontal line by merely applying these signals to vertical and horizontal plates, respectively. In any event, graticule scales may be provided co-linear with the traces to permit immediate quantification.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a schematic diagram of one embodiment of the present invention;

FIGS. 2, 3 and 4 represent various forms of display provided by the embodiment of FIG. 1;

FIG. 5 is a schematic diagram of another embodiment of the present invention; and FIGS. 6 and 7 represent various forms of display provided by the embodiment of FIG. 5.

DESCRIPTION OF PREFERRED EMBODIMENTS

Referring to FIG. 1 of the accompanying drawings, a telephone line test set 10 receives a test signal from a signal transmission path under test. Test set 10 may be the phase jitter meter described and illustrated in U.S. Pat. No. 3,711,773 to Hekimian et al. The test signal may be a sinusoidal test tone which is received after traversing a telephone signal transmission path under test. Typically, the test tone is successively applied to the transmission path at different frequencies to test the characteristics of the path at those frequencies. Amplitude jitter appearing on the received test signal is provided as one output signal (AMP. JITTER) from test set 10 and is applied across a variable resistor 11. This amplitude jitter signal may be derived (as described above) from the output of amplifier 463 in FIG. 5 of the Hekimian et al patent and represents amplitude jitter introduced onto the test signal by the transmission path under test. Importantly, the test tone itself is removed from the jitter signal within test set 10 (as described in the Hekimian et al patent) so that the AMP. JITTER signal is purely amplitude jitter. Similarly, a φ JITTER signal is provided by test set 10 and represents the phase jitter (minus test tone component) introduced onto the test signal by the transmission path under test. The φ JITTER signal is applied across a variable resistor 12.

The AMP JITTER signal is applied to one input terminal of a chopper 13; the φ JITTER signal is applied to the other input terminal. The choper 13 alternately passes signal to oscilloscope 15 from one input terminal and then the other under the control of a chopping signal provided by a signal generator 14. The chopping signal is preferably a square wave which has a frequency sufficiently greater than the bandwidth of the two jitter signals to permit proper sampling. The jitter signals are low frequency signals which cut off at approximately 250 to 300 Hz; therefore, a chopping signal frequency on the order of 1000 Hz is suitable. Chopper 13 may be any suitable single-pole double-throw transmission gate, such as model CD4053 manufactured by Radio Corporation of America. The effect of chopper 13 is to pass the amplitude jitter signal for approximately one-half of the chopping signal period and to pass the phase jitter signal for approximately the other half of that period.

Signals passed by chopper 13 are applied to the vertical deflection plates of an oscilloscope 15. The square wave chopping signal is passed through variable resistor 16 to the horizontal deflection plates of oscilloscope 15. The resulting display is depicted in FIG. 2 wherein a vertical line trace 20 on the left-hand side of the display represents amplitude jitter and a vertical line trace on the right-hand side of the display represents phase jitter. Specifically, during one-half cycle of the chopping signal the vertical line trace 20 is provided, the length of the line being a measure of amplitude jitter. During the second half cycle the line trace 21 is provided, the length of the line being a measure of phase jitter. A graticule scale 22, calibrated in units of amplitude jitter, is provided co-linearly with trace 20 on the oscilloscope screen so that instantaneous amplitude jitter level can be immediately observed. A similar graticule scale 24, calibrated in units of phase jitter, is provided co-linearly with trace 21. Resistor 16 and the internal gain control of the scope 15 can be adjusted to assure the co-lineal placement of the traces 20, 21 with scales 22, 24, respectively. In the absence of either amplitude or phase jitter, the respective trace takes the form of a dot.

The display illustrated in FIG. 2 makes it extremely easy for an observer to quantify the amplitude and phase jitter. This is because the jitter traces are linear, not arcuate, and are not mutually interactive as in the case of the display in U.S. Pat. No. 3,906,173. Moreover, quantification is made even simpler by providing scales 22 and 24 co-linear with the traces.

It should be understood, of course, that one or the other of the jitter traces can be blocked out from the display simply by adjusting calibrate resistors 11 or 12 for zero signal. Thus, phase jitter trace 21 is eliminated in the display of FIG. 3, this being accomplished by merely adjusting resistor 12 for maximum attenuation. Likewise, amplitude jitter trace 20 is eliminated in the display of FIG. 4, this being accomplished by adjusting resistor 11 for maximum attenuation.

It is also understood that the frequency of the chopping signal is sufficiently high relative to the persistence of the oscilloscope trace that the alternation between jitter signals during alternate half cycles cannot be perceived.

It must also be recognized that the traces 20 and 21 may be oriented horizontal simply by reversing the connections to the vertical and horizontal deflection plates in FIG. 1.

Another embodiment of the present invention is illustrated in FIG. 5 wherein similar components bear the same reference numerals as in FIG. 1. The test signal received from the transmission path under test is processed by telephone line test set 10 to provide the AMP JITTER and φ JITTER signals across variable resistors 11 and 12, respectively. The AMP JITTER signal is applied to one input of chopper 30, the other input of which is connected to the arm of a potentiometer 32. The φ JITTER signal is applied to one input of a chopper 31, the other input of which is connected to the arm of potentiometer 33. Potentiometer 32 and 33 are each connected between positive and negative low voltage points. Both choppers 30, 31 are controlled by the square wave chopping signal from signal generator 14. Signal passed by chopper 30 is applied to the vertical deflection plates of oscilloscope 15; signal passed by chopper 31 is applied to the horizontal plates. Choppers 30 and 31 are the same type of single-pole double-throw transmission gates as chopper 13 of FIG. 1. The connection of the chopper inputs ar such that when the AMP JITTER signal is passed through chopper 30 to the vertical deflection plates of scope 15, the horizontal deflecting plates are connected to the arm of potentiometer 33. Likewise, when the φ JITTER signal is passed through chopper 31 to horizontal deflection plates of scope 15, the vertical deflection plates are connected to the arm of potentiometer 32. Therefore, only one of the jitter signals is connected to oscilloscope 15 at a time, the connected signal being alternated at the chopping signal frequency; and one set of deflection plates is always connected to the bias level at potentiometers 32 or 33.

The display provided by the arrangement of FIG. 5 may take the form illustrated in FIG. 6. Specifically, the amplitude jitter appears as a vertical linear trace 35 and the phase jitter appears as a horizontal linear trace 36. These traces actually alternate at the chopping frequency; however, as was the case in the FIG. 1 arrangement, the chopping frequency is sufficiently high compared to the persistence characteristic of the oscilloscope as to render this alternation imperceptible to the viewer.

A vertical graticule scale 37 is provided co-linear with trace 35 to permit direct quantification of amplitude jitter. Likewise, a horizontal graticule scale 38 is provided co-linear with trace 36 to permit direct quantification of phase jitter. There is no mutual interaction between the traces, so that the traces remain co-linear with their respective scales. The positioning of traces 35 and 36 to cross one another as in FIG. 6 is achieved by adjusting potentiometer 32 until the two dots (representing traces 35 and 36 with zero amplitude and phase jitter) are positioned at the intersection of scales 37 and 38. If the cross trace display is not desired potentiometers 32 and 33 can be adjusted to separate traces 35 and 36 as shown in FIG. 7. The scales 37 and 38 should be selected accordingly.

The test set 10 employed herein need not be the one described in the Hekimian et al U.S. Pat. No. 3,711,773. For example, a suitable test set is described in U.S. Pat. No. 3,814,868 wherein two quadrature-related signals are derived as a measure of amplitude and phase jitter, respectively. The two quadrature-related signals may then be displayed in the same manner described herein (FIG. 1 or FIG. 5) for the AMP JITTER and φ JIT- TER signals. The preferred approach, however, is the use of the non-quadrature-related amplitude and phase jitter signals derived, for example, as described above in reference to the Hekimian et al patent (U.S. Pat. No. 3,711,773).

It is to be understood that while the present invention has been described in terms of an oscilloscope having vertical and horizontal deflection plates, the invention should not be so limited. Specifically, any display device having orthogonally related input circuits which respond to application of input signals thereto by providing a display is suitable. Further, although the invention is described above in terms of displaying amplitude and phase variations, it is to be understood that the chopper concepts described are useful for displaying any two disturbance parameters which correspond to a vector magnitude (e.g. amplitude jitter) and vector angle (e.g. phase jitter).

It is to be further understood that three or more traces can be displayed simultaneously if desired. For example, if it is desired to display the cross-product of the amplitude and phase jitter signals of FIG. 1, a multiplier circuit would be added and chopper 13 would be changed to a three-state device which sequentially passes the amplitude jitter, phase jitter and the cross-product signals in response to a suitable three-level control signal. Likewise, ratio relationships of the primary signals can be displayed in a similar manner.

While we have described and illustrated one specific embodiment of our invention, it will be clear that variations of the details of construction which are specifically illustrated and described may be resorted to without departing from the true spirit and scope of the invention as defined in the appended claims.

We claim:

1. Apparatus for displaying amplitude and phase variations introdced onto a test signal while the test signal traverses a signal transmission path under test, said apparatus comprising:
    signal processing means including:
        means for receiving from said transmission path under test said test signal with said amplitude and phase variations;
        means for deriving a phase jitter signal separated from said test signal and representative of instantaneous phase variations introduced onto said test signal in said transmission path; and
        means for deriving an amplitude jitter signal separated from said test signal and representative of instantaneous amplitude variations introduced onto said test signal in said transmission path;
    display means having first and second orthogonal input circuits responsive to the application of signals thereto for generating a display;
    signal generator means for providing a substantially square wave signal at a frequency which is greater than the highest frequency of interest in said amplitude and phase jitter signals;
    chopper means responsive to said square wave signal for alternately applying said amplitude jitter signal and said phase jitter signal to said first input circuit at the frequency of said square wave signal; and
    means connecting said square wave signal to said second input circuit.

2. The apparatus according to claim 1 wherein said display means is a cathode ray oscilloscope having a display screen and said first and second input circuits are vertical and horizontal deflection plates, respectively, and further comprising:
    a first linear graticule scale overlying said display screen, calibrated in units of amplitude jitter, and extending vertically along said display screen;
    a second linear graticule scale overlying said display screen, calibrated in units of phase jitter, and extending vertically along said display screen at a location spaced from said first graticule scale; and
    adjustment means for horizontally positioning the displays of said amplitude jitter signal and said phase jitter signal into alignment with said first and second graticule scales, respectively.

3. The apparatus according to claim 1 further comprising means for selectively adjusting the levels of amplitude jitter and phase jitter signals.

4. The apparatus of according to claim 1 wherein said display means includes a display screen, said apparatus further comprising:
    a first linear graticule scale overlying said display screen, calibrated in units of amplitude jitter, and extending along said display screen;
    a second linear graticule scale overlying said display screen, calibrated in units of phase jitter, and extending along said display screen parallel to said first linear graticule scale at a location spaced from said first graticule scale; and
    adjustment means for positioning the displays of said amplitude jitter signal and said phase jitter signal into alignment with said first and second graticule scales, respectively.

5. The method of displaying amplitude and phase jitter introduced onto a test signal in a signal transmission path under test, said method comprising the steps of:
    processing said test signal received from said transmission path to provide: an amplitude jitter signal separated from said test signal and representative of instantaneous amplitude jitter introduced onto said test signal, and a phase jitter signal separated from said test signal and representative of instantaneous phase jitter introduced onto said test signal;
    alternately applying said amplitude jitter signal and said phase jitter signal to one pair of two pairs of orthogonally related deflection plates of a cathode ray oscilloscope, the alternate application being at a chopping frequency which is greater than the highest frequency of interest in said amplitude and phase jitter signals; and
    applying a square wave having said chopping frequency to the other pair of said deflection plates.

6. Apparatus for displaying amplitude and phase variations introduced onto a test signal while the test signal traverses a signal transmission path under test, said apparatus comprising:
    signal processing means including:
        means for receiving from said transmission path under test said test signal with said amplitude and phase variations;
        means for deriving a phase jitter signal separated from said test signal and representative of instantaneous phase variations introduced onto said test signal in said transmission path; and
        means for deriving an amplitude jitter signal separated from said test signal and representative of instantaneous phase variations introduced onto said test signal in said transmission path; and means for deriving an amplitude jitter signal separated from said test signal and representative of instantaneous amplitude variations introduced onto said test signal in said transmission path;

display means having first and second orthogonal input circuits responsive to the application of signals thereto for generating a display;

signal generator means for providing a substantially square wave chopping signal at a frequency which is greater than the highest frequency of interest in said amplitude and phase jitter signals; and chopper means responsive to said chopping signal for alternately connecting said first input circuit to receive said amplitude jitter signal while returning said second input circuit to a reference voltage level and then returning said first input circuit to said reference voltage level while applying said phase jitter signal to said second input circuit.

7. The apparatus according to claim 6 wherein said display means is a cathode ray oscilloscope having a display screen and said first and second input circuits are vertical and horizontal deflection plates, respectively, and further comprising:

a first linear graticule scale overlying said display screen, calibrated in units of amplitude jitter, and extending vertically along said display screen;

a second linear graticule scale overlying said display screen, calibrated in units of phase jitter, and extending horizontally along said display screen;

adjustment means for selectively positioning the displays of said amplitude jitter signal and said phase jitter signal into alignment with said first and second graticule scales, respectively.

8. The method of displaying amplitude and phase jitter introduced onto a test signal in a signal transmission path under test, said method comprising the steps of:

processing said test signal received from said transmission path to provide: an amplitude jitter signal separated from said test signal and representative of instantaneous amplitude jitter introduced onto said test signal, and a phase jitter signal separated from said test signal and representative of instantaneous phase jitter introduced onto said test signal; and alternately applying said amplitude jitter signal to one pair of two pairs of othrogonally-related deflection plates of a cathode ray oscilloscope while connecting a reference voltage level to the other pair of deflection plates and then applying said phase jitter signal to said other pair of deflection plates while connecting said reference voltage level to said one pair of deflection plates.

* * * * *